US012691313B2

(12) United States Patent
Laprade et al.

(10) Patent No.: US 12,691,313 B2
(45) Date of Patent: Jul. 28, 2026

(54) SYSTEMS AND METHODS OF FLUID OPERATED CONCEALED SPRINKLERS WITHIN CLOSED CAVITIES

(71) Applicant: Tyco Fire Products LP, Lansdale, PA (US)

(72) Inventors: Alex Laprade, Cranston, RI (US); Sean E. Cutting, West Warwick, RI (US); Krista Nolan, Foxborough, MA (US); Barbara L. Churchill, Pawtucket, RI (US); Steven L. Shields, Lubbock, TX (US); Prashant A. Kulkarni, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 475 days.

(21) Appl. No.: 18/042,381

(22) PCT Filed: Nov. 5, 2021

(86) PCT No.: PCT/IB2021/060288
§ 371 (c)(1),
(2) Date: Feb. 21, 2023

(87) PCT Pub. No.: WO2022/097101
PCT Pub. Date: May 12, 2022

(65) Prior Publication Data

US 2023/0201644 A1 Jun. 29, 2023

Related U.S. Application Data

(60) Provisional application No. 63/110,589, filed on Nov. 6, 2020.

(51) Int. Cl.
*A62C 31/02* (2006.01)
*A62C 35/68* (2006.01)
*A62C 37/14* (2006.01)

(52) U.S. Cl.
CPC .............. *A62C 31/02* (2013.01); *A62C 35/68* (2013.01); *A62C 37/14* (2013.01)

(58) Field of Classification Search
CPC ......... A62C 37/09; A62C 37/11; A62C 37/14; A62C 31/02; Y10S 239/01
See application file for complete search history.

(56) References Cited

U.S. PATENT DOCUMENTS 5,020,601 A * 6/1991 Retzloff ................. A62C 35/68 169/37
6,082,463 A * 7/2000 Ponte ..................... A62C 37/09 169/41

(Continued)

FOREIGN PATENT DOCUMENTS

CN 203777562 U 8/2014
JP 2013-034853 A 2/2013

(Continued)

OTHER PUBLICATIONS

Korean Intellectual Property Office as International Searching Authority; International Search Report and Written Opinion; PCT/IB2021/060288; Feb. 11, 2022; 9 pages.

*Primary Examiner* — Tuongminh N Pham
(74) *Attorney, Agent, or Firm* — Foley & Lardner LLP

(57) ABSTRACT

A concealed sprinkler can include a body that defines an outlet, a seal that seals the outlet, an activation element coupled with the seal, a housing, a cover plate, and a wall. The activation element changes from a first state to a second state responsive to a fire condition to allow the seal to be displaced from the outlet. The housing extends from a first housing end that extends from the body to a second housing end, and defines a chamber around the activation element. The cover plate is coupled with the second housing end. The wall extends towards the activation element to form an air flow channel to the activation element adjacent to the wall.

(Continued)

At least one of the cover plate and the wall are removably coupled with the body.

20 Claims, 23 Drawing Sheets

(56) References Cited

U.S. PATENT DOCUMENTS

| | | | | |
|---|---|---|---|---|
| 6,840,329 | B2 | 1/2005 | Kikuchi et al. | |
| 2010/0236797 | A1* | 9/2010 | VanEerden ............ | A62C 37/12 169/57 |
| 2013/0020406 | A1 | 1/2013 | Koiwa | |
| 2015/0283414 | A1* | 10/2015 | Chen ...................... | A62C 35/68 169/37 |

FOREIGN PATENT DOCUMENTS

| | | | |
|---|---|---|---|
| JP | 2013-208146 | A | 10/2013 |
| WO | WO-2006/105758 | A2 | 10/2006 |

* cited by examiner

SYSTEMS AND METHODS OF FLUID OPERATED CONCEALED SPRINKLERS WITHIN CLOSED CAVITIES

CROSS-REFERENCE TO RELATED APPLICATIONS

The present application claims the benefit of priority to U.S. Provisional Application No. 63/110,589, filed Nov. 6, 2020, the disclosure of which is incorporated herein by reference in its entirety.

BACKGROUND

Sprinkler systems can be used to address fire conditions. For example, the sprinkler system can include one or more sprinklers that receive fluid from a fluid supply and output the fluid to address the fire condition.

SUMMARY

At least one aspect relates to a concealed sprinkler. The sprinkler can include a body that defines an outlet, a seal that seals the outlet, an activation element coupled with the seal, a housing, a cover plate, and a wall. The activation element changes from a first state to a second state responsive to a fire condition to allow the seal to be displaced from the outlet. The housing extends from a first housing end that extends from the body to a second housing end, and defines a chamber around the activation element. The cover plate is coupled with the second housing end. The wall extends towards the activation element to form an air flow channel to the activation element adjacent to the wall. The cover plate can be driven away from the second housing end by fluid outputted from the outlet responsive to the seal being displaced from the outlet, such as to allow the fluid to be outputted from the sprinkler in accordance with a target spray pattern. At least one of the cover plate and the wall are removably coupled with the body.

At least one aspect relates to a sprinkler system. The sprinkler system includes a building structure that defines a cavity and a sprinkler. The sprinkler includes a body that defines an inlet coupled with one or more pipes and an outlet coupled with the inlet, a seal that seals the outlet to prevent fluid from the one or more pipes from flowing through the outlet, an activation element coupled with the seal, the activation element changes from a first state to a second state to allow the fluid to flow through the outlet, a housing coupled with the body and positioned in the cavity, the housing defines a chamber around the activation element, a cover plate coupled with the housing, and a wall that extends from the cover plate towards the activation element to form an air flow channel to the activation element along the wall. The cover plate can be driven away from the second housing end by fluid outputted from the outlet responsive to the seal being displaced from the outlet, such as to allow the fluid to be outputted from the sprinkler in accordance with a target spray pattern. At least one of the cover plate and the wall are removably coupled with the body.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
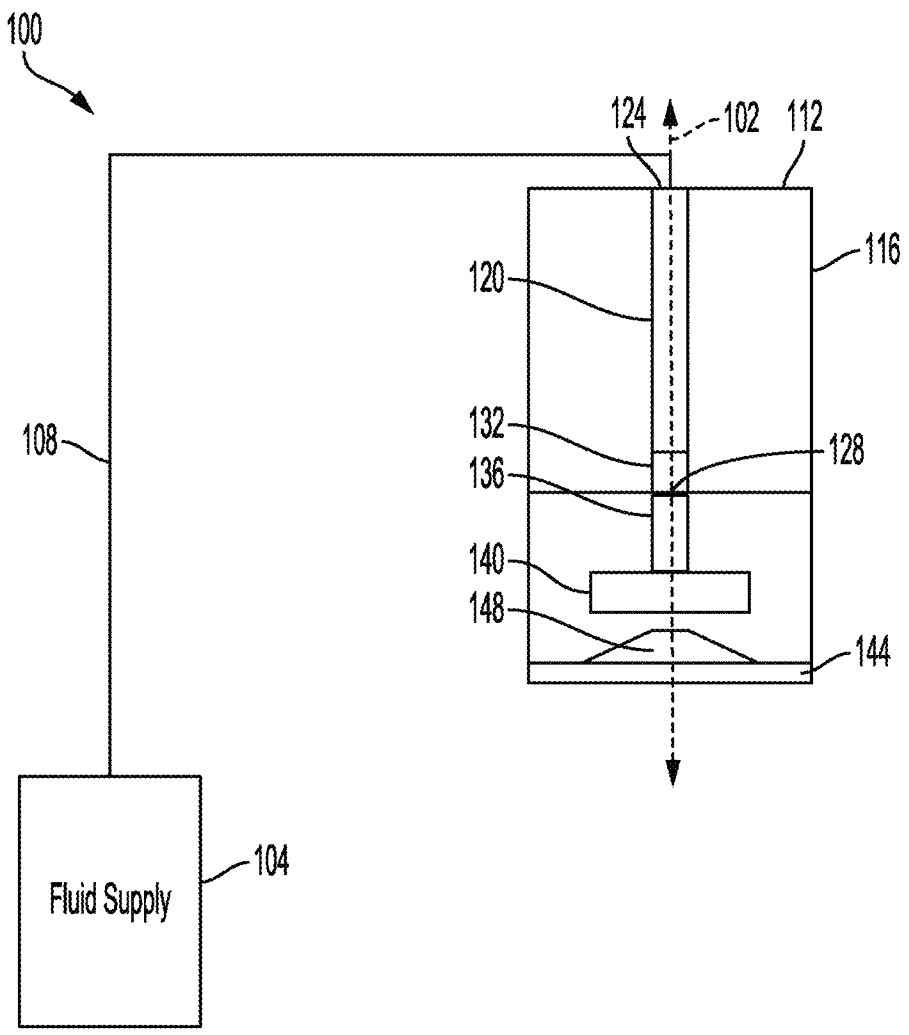
FIG. 1 is a schematic diagram of an example of a sprinkler system.

Following below are more detailed descriptions of various concepts related to, and implementations of systems and methods of concealed sprinklers within closed cavities. The various concepts introduced above and discussed in greater detail below can be implemented in any of numerous ways, including in concrete ceiling implementations.

Concealed sprinklers can include a cover plate that is positioned between components of the sprinkler, such as a deflector and activation element, and a space that the sprinkler is to protect, such as a room in a building. The sprinkler can be installed in a cavity in a structure, such as a ceiling. For example, the sprinkler can be installed in a cavity defined in a concrete ceiling. The sprinkler can be installed in an open ceiling.

Effective operation of the sprinkler responsive to a fire condition can depend on timing of activation of the activation element to allow fluid to flow through the sprinkler to the deflector and out into the space. The activation element can be activated responsive to heat from a fire. For example, air in the space heated by the fire can flow into the cavity to cause the activation of the activation element, such that the time for the activation element to be activated can depend on the flow rate of the air. Structures of some concealed sprinklers, such as cover plates, can reduce the flow rate of air from the space in which the fire is present towards the activation element, which can increase the time for the activation element to be activated. In various concealed sprinkler installations, such as embedded installations in cavities, air flow can be impeded from entering the cavity and thus from transferring heat to the activation element, increasing the time for the activation element to be activated.

Systems and methods in accordance with the present disclosure can increase the heat transfer rate to the activation element of concealed sprinklers, such as by at least one of increasing the flow rate of air from the space to the activation element and increasing turbulence of the air flowing from the space to the activation element. For example, the sprinkler can include a wall between the cover plate and the activation element that can be sized and shaped to direct air from the space to the activation element. The wall can include structures such as ramps, fins, baffles, and vents to facilitate the air flow to the activation element, including by increasing turbulence of the air flow (which can increase the convective heat transfer rate from the air to the activation element). The wall can be sized to define a gap between the cover plate and the ceiling into which the concealed sprinkler is installed that facilitates the air flow.

Systems and methods in accordance with the present disclosure can cause the cover plate to be released or separated from the sprinkler within a threshold amount of time after activation of the activation element. For example, the cover plate can be removably coupled with the sprinkler in a manner to ensure that the cover plate releases from the sprinkler by force applied by fluid outputted by the sprinkler (e.g., compared to sprinklers in which the cover plate is designed to be released relatively early responsive to a fire condition, such as on the order of thirty seconds or more prior to activation of the activation element, such as by melting of solder, which may not necessarily operate properly in various applications described herein including installing the sprinklers in cavities of building structures, such as cavities in concrete ceilings). The cover plate can be provided in an assembly with one or more components, such as the retaining ring and/or the wall, to enable the assembly (including the cover plate) to be released from the sprinkler by the force applied by the fluid. For example, the assembly can be removably coupled with a sprinkler cup around the sprinkler, and a retention force between the assembly and the sprinkler cup can be less than an expected (e.g., minimum) force to be applied by fluid outputted by the sprinkler onto the assembly to allow the assembly to be driven off of the sprinkler cup.

FIG. 1 depicts an example of a sprinkler system 100. The sprinkler system 100 can include a fluid supply 104. The fluid supply 104 can store fluids to be used to address a fire condition, which can include at least one of water and one or more fire suppression agents.

The sprinkler system 100 can include one or more pipes 108. The pipes 108 can be connected with the fluid supply 104 and extend from the fluid supply 104. The pipes 108 can extend through a structure, such as a building. Fluid from the fluid supply 104 can be present in the pipes 108 and flow through the pipes 108. The pipes 108 can include any of a variety of conduits that can be used to flow fluid (e.g., water or other fire suppression agents), including but not limited to piping, tubing, metal pipes, rigid pipes, or polymeric (e.g., chlorinated polyvinyl chloride (CPVC)) pipes.

The sprinkler system 100 can include at least one sprinkler 112. The sprinkler 112 can receive fluid from the fluid supply 104 through the one or more pipes 108 and output the fluid to address a fire condition. The sprinkler 112 can be a concealed sprinkler.

The sprinkler 112 can include a body 116 that defines a fluid passageway 120 extending from an inlet 124 (which can be coupled with the one or more pipes) to an outlet 128. The sprinkler 112 can include a seal 132 that seals the outlet 128. The seal 132 can include a sprinkler button. The fluid passageway 120 can define a sprinkler axis 102.

The sprinkler 112 can include an activation element 136 coupled with the seal 132 to maintain the seal 132 in a first state in which the seal 132 seals the outlet 128. The activation element 136 can include one or more components that change state from the first state to a second state by being activated responsive to a fire condition (e.g., responsive to temperature or a rate of rise of temperature meeting or exceeding a threshold value). In the second state, at least a portion of the activation element 136 can be separated from a remainder of the activation element 136. The activation element 136 can include a bulb that includes a fluid that expands to break the bulb, or a fusible link (e.g., link components coupled with solder) that separates responsive to the fire condition to break. For example, by changing state, the activation element 136 can discontinue applying a force against the seal 132, allowing the seal 132 to move away from the outlet 128 to allow fluid to flow through the outlet 128.

The sprinkler 112 can include a deflector 140 downstream of the outlet 128. The deflector 140 can receive the fluid that flows out of the outlet 128 and deflect the fluid according to a target spray pattern (e.g., a spray pattern corresponding to the geometry of the deflector 140).

The sprinkler 112 can include a cover plate 144. The cover plate 144 can be coupled with the body 116. The cover plate 144 can at least partially extend beyond a space defined by a perimeter of the deflector 140 or other components of the sprinkler 112. The cover plate 144 can include features such as chamfers on an outer edge.

The cover plate 144 can be removably coupled with the body 116 (e.g., using at least one of solder and a retaining ring) or various components of the sprinkler 112 coupled with the body 116, such as a retaining ring or support cup. The cover plate 144 can be coupled with the body 116 (including with a retaining ring of the body 116 or coupled with the body) using various coupling devices or materials described herein, such as magnets, clips, tabs, rivets, adhesives (e.g., epoxy), or various combinations thereof. The cover plate 144 as well as a wall (e.g., wall 148) and retaining ring can be removably coupled with the body 116 using various coupling devices or materials described herein, such as adhesives, clips, or tabs.

The cover plate 144 can be made of various materials, such as stainless steel, brass, or copper. The cover plate 144 can have a thickness greater than 0.01 inches and less than 0.1 inches.

The cover plate 144 can decouple from the body 116 responsive to the fire condition within a threshold amount of time after activation of the activation element 136 responsive to the fire condition (e.g., by being driven off the body 116 by the force of the fluid outputted by the sprinkler 112 subsequent to activation of the activation element 136). The decoupling of the cover plate 144 can be based on various factors relating to the connection between the cover plate 144 and the body 116, such as bonding between the cover plate 144 and the body 116 (e.g., using solder and adhesive as discussed above), or mechanical attachment between the cover plate 144 and the body 116 (e.g., using component such as tabs or retaining rings as described further herein). As such, the cover plate 144 can be maintained in position for wall 148 described below to increase the heat transfer rate to the activation element 136.

The sprinkler 112 can include a wall 148 that extends from the cover plate 144 towards the activation element 136. The wall 148 can facilitate heat transfer to the activation element 136, such as to increase at least one of a rate of air flow to the activation element 136 and a turbulence of the air flow to the activation element 136 (e.g., increasing the turbulence can increase a convective heat transfer rate between the air and the activation element 136). For example, as described herein, the wall 148 can include various features such as ramps, baffles, fins, and vents to increase the rate of heat transfer to the activation element 136. The wall 148 can be formed as a plurality of walls (e.g., as fins).

Figure 2:
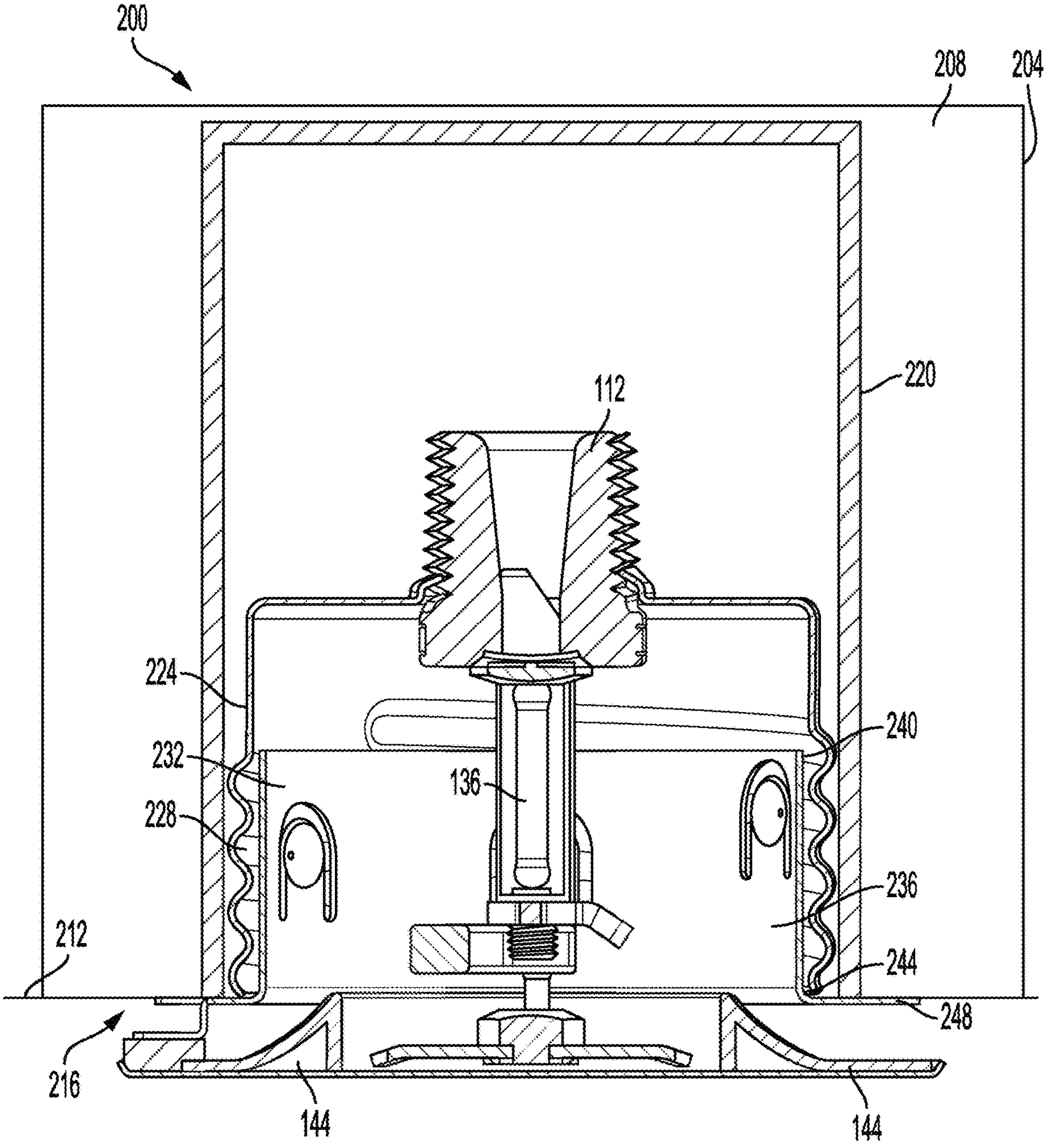
FIG. 2 is a schematic diagram of an example of an installation of a sprinkler.

FIG. 2 depicts an example of a sprinkler assembly 200 in which the sprinkler 112 can be installed or embedded in a cavity 208 defined by a building structure 204. The building structure 204 can be made from various materials, including but not limited to concrete. The building structure 204 can extend to a ceiling 212, which can be integrally formed with or a separate material from the building structure 204 (e.g., the ceiling 212 can include a ceiling panel coupled with the building structure 204).

The one or more pipes 108 can extend through at least a portion of the building structure 204. The cavity 208 can be formed between the pipes 108 described with reference to FIG. 1 and the ceiling 212. The sprinkler 112 can be at least partially positioned in the cavity 208, and coupled with the one or more pipes 108. The cavity 208 can be open to a space 216 below the ceiling 212, such as a space 216 that the sprinkler 112 is used to protect in the event of a fire condition. The sprinkler 11322 can be arranged in or coupled with a sprinkler box 220 provided in the cavity 208. The sprinkler box 220 can be a box used to support or install the sprinkler 112 in the ceiling 212, such as in a concrete ceiling installation.

As depicted in FIG. 2, the cover plate 144 can extend across the cavity 208 and at least partially extend under the ceiling 212. The geometry of the installation of the sprinkler 112, such as the shape of the cavity 208 and the positioning of the cover plate 144, can limit a rate of air flow and thus heat transfer to the activation element 136, which can delay the activation of the activation element 136 and thus the timing of delivery of fluid from the sprinkler 112. For example, the position of the sprinkler 112 within the cavity 208 (e.g., how far the sprinkler 112 is embedded in the cavity), as well as the volume or size of the cavity 208, can significantly affect activation times.

As depicted in FIG. 2, the sprinkler 112 can be coupled with various housing, shell, or support components or assemblies thereof, which may each be formed as various removable or integrated components to enable effective timing of release of the cover plate 144 from the sprinkler 112. For example, the sprinkler 112 can be coupled with a cup 224 (e.g., sprinkler housing, sprinkler cup, support cup), which can be coupled with the body 116 and extend around the body 116, activation element 136, and deflector 140 (e.g., defining a chamber 228 to receive these components of the sprinkler 112). The cup 224 can include an engagement member 228, such as threading, to connect with other components, such as a retaining ring 232 (e.g., shell, coupling member, housing, support structure).

The retaining ring 232 can include a housing portion 236 extending from a first housing end 240 to a second housing end 244, and a ring wall 248 extending radially outward from the second housing end 244. The first housing end 240 can be aligned with a portion of the activation element 136, and the second housing end 244 can be aligned so that the ring wall 248 extends adjacent to the cup 224. The cover plate 144 and the wall 148 can be coupled with the retaining ring 232 and can direct air flow into the housing portion 236 towards the activation element 136.

The fire condition can correspond to an increase in temperature in air in the space 216, resulting in heat transfer from the space 216 into the cavity 208. Sprinklers 112 in accordance with various features described herein can increase the rate of heat transfer from the space 216 to the activation element 136 in the cavity 208 (e.g., despite the ceiling 204 potentially blocking air flow through the cavity 208), reducing the response time of the sprinkler 112 to the fire condition.

Figure 3:
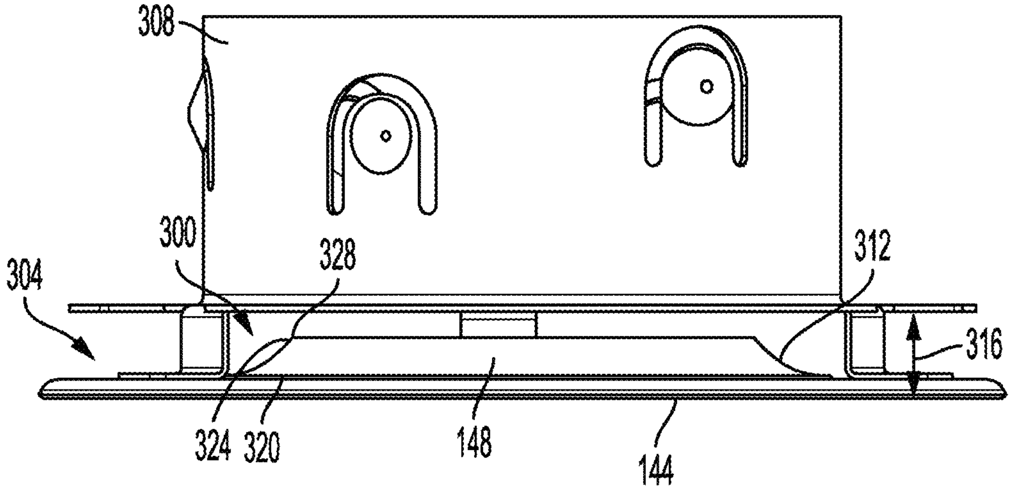
FIG. 3 is a side view of an example of a portion of a sprinkler including a wall defining an air flow channel to an activation element of the sprinkler.
Figure 4:
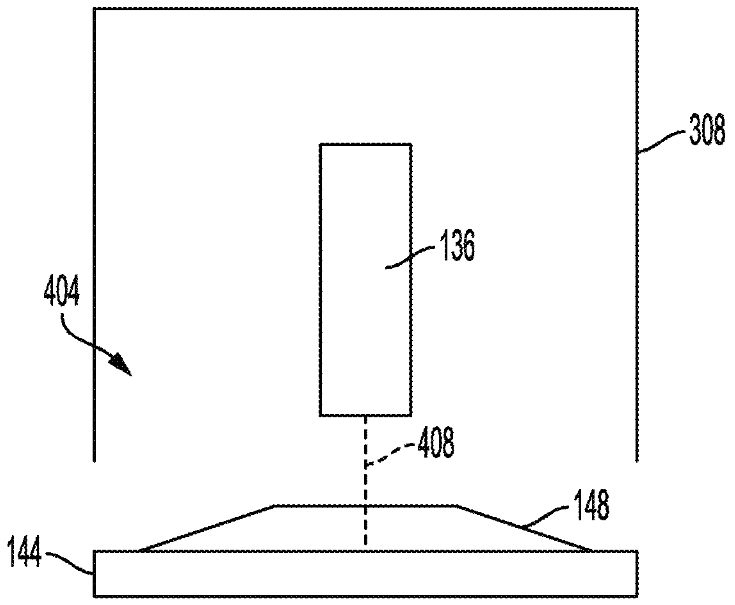
FIG. 4 is a schematic diagram of a portion of a sprinkler including a wall defining an air flow channel to an activation element of the sprinkler.

FIGS. 3 and 4 depict an example of the sprinkler 112 that includes the wall 148 extending from the cover plate 144. The wall 148 and cover plate 144 individually and together can be provided in various arrangements (e.g., single integrated or monolithic component; multiple piece assemblies). The wall 148 can define a channel 300 adjacent to the wall 148. The channel 300 can extend from a channel inlet 304 into a chamber 404 defined by a housing portion 308 (e.g., the housing portion 236 of the retaining ring 232 as described with reference to FIG. 2). The housing portion 308 can be coupled with one or more walls of the cavity 208, such as where the housing portion 308 is coupled with the sprinkler box 220 as described with reference to FIG. 2.

The activation element 136 can be in the chamber 404, so that air flowing through the channel 300 can transfer heat to the activation element 136. As such, a response time of activation of the activation element 136 relative to a fire condition can correspond to a rate of air flow through the channel 300 towards the activation element 136. Such factors can be affected by the arrangement or geometry of the cavity 208; for example, the occupancy or storage commodities that the sprinkler 112 is provided to protect can correspond with the arrangement or geometry of the cavity 208 and thus the size of walls of the cavity 208 relative to the location of the activation element 136 in the cavity 208.

The wall 148 can be shaped to increase heat transfer to the activation element 136, such as by increasing at least one of the rate of air flow in the channel 300 and a turbulence of the air flow. As depicted in FIGS. 3 and 4, the wall 148 can form a ramp that decreases in diameter as the wall 148 extends from the cover plate 144. The wall 148 can be conical. The wall 148 can define a wall surface 312 facing the channel 300 that is concave.

The channel inlet 304 can define a gap 316. The gap 316 can extend from the cover plate 144 to at least one of the housing 308 and the ceiling 212. The gap 316 can be sized to facilitate air flow into the channel 300 and along the wall 148 and structures thereof. For example, the gap 316 can be larger than a minimum size at which an expected increase in heat transfer by air flow through the channel 300 satisfies a threshold, and can be less than a maximum size greater than which that air flow does not satisfy the threshold (e.g., as the gap 316 decreases in size, there may be insufficient volume to allow the air to be drawn into the channel 300; as the gap 316 increases in size, there may be less relative interaction with the wall 148, to a point at which the air flow in the channel 300 may have little to no increase in flow due to the wall 148).

The gap 316 can be greater than or equal to 0.01 inches and less than or equal to 2.5 inches. The gap 316 can be greater than or equal to 0.125 inches and less than or equal to 1.25 inches. The gap 316 can be greater than or equal to 0.25 inches and less than or equal to 0.75 inches. The gap 316 can be 0.5 inches. The sizing of the gap 316 can be related to at least one of a length of the wall 148 and a distance 408 from the cover plate 144 to the activation element 136. For example, a ratio of the gap 316 to the distance 408 can be greater than or equal to 2:1 and less than or equal to 1:2, including any ratio within these ranges.

The wall 148 can define an angle 320 from a first end 324 of the wall 148 to a second end 328 of the wall 148 relative to the cover plate 144. The angle 320 can correspond to a direction in which the wall 148 directs air flow towards the activation element 136 or a portion thereof. The angle 320 can correspond to factors such as a position of the activation element 136 relative to the wall 148 and an expected velocity of air flowing over the wall 148, which can correspond to the types of hazards or commodities to be protected using the sprinkler assembly 200. The angle 320 can be greater than twenty degrees and less than seventy degrees. The angle 320 can be greater than thirty degrees and less than sixty degrees. The angle 320 can be 45 degrees. The angle 320 can be any of a variety of angles within such ranges.

Figure 5:
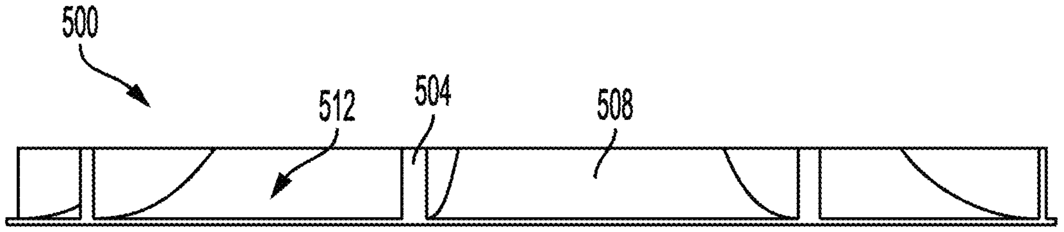
FIG. 5 is a side view of an example of a cover plate and wall of a sprinkler.

FIG. 5 depicts an example of a wall 500. The wall 500 can be used to implement the wall 148 and features thereof as described with reference to FIGS. 2-4. The wall 500 can include a plurality of fins 504 that extend outward from a wall surface 508. The fins 504 can extend to a lateral extent of the cover plate 144. The fins 504 can separate the channel 300 into channels 512, which can facilitate directing the air flow towards the activation element 136. The spacing between the walls 504 or number of walls 504 can increase/decrease the flow to the activation element 136 (e.g., in a manner analogous to components such as that described for channel 300 and gap 316). Curvature of the wall surface 508 can be selected to affect the air stream as it travels to the activation element 136. The size of the fins 504 (e.g., thickness) can also facilitate the amount of air into the cavity (e.g., too large will begin to impede air flow).

Figure 6:
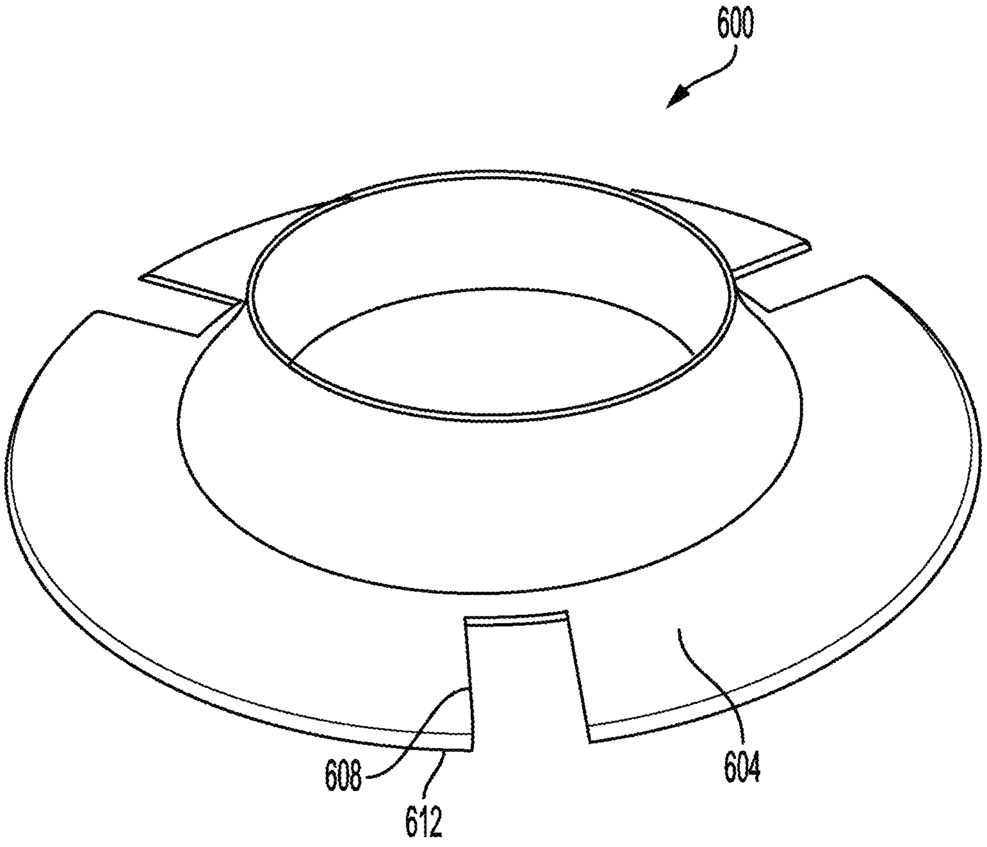
FIG. 6 is a perspective view of an example of a cover plate and wall of a sprinkler.

FIG. 6 depicts an example of a wall 600. The wall 600 can incorporate features of the wall 500 described with reference to FIG. 5. The wall 600 can be coupled with or integrally formed with a cover plate (e.g., cover plate 144 described with reference to FIG. 1). The wall 600 can include an extension 604. The extension 604 can define a plurality of slots 608. The slots 608 can be shaped to facilitate drawing air from below the extension 604 into air flow along the wall 600 (e.g., into channel 300). The slots 608 can extend inward from a perimeter 612 of the extension 604 towards the wall 600. The slots 608 can extend more than halfway from the perimeter 612 to the wall 600.

Figure 7:
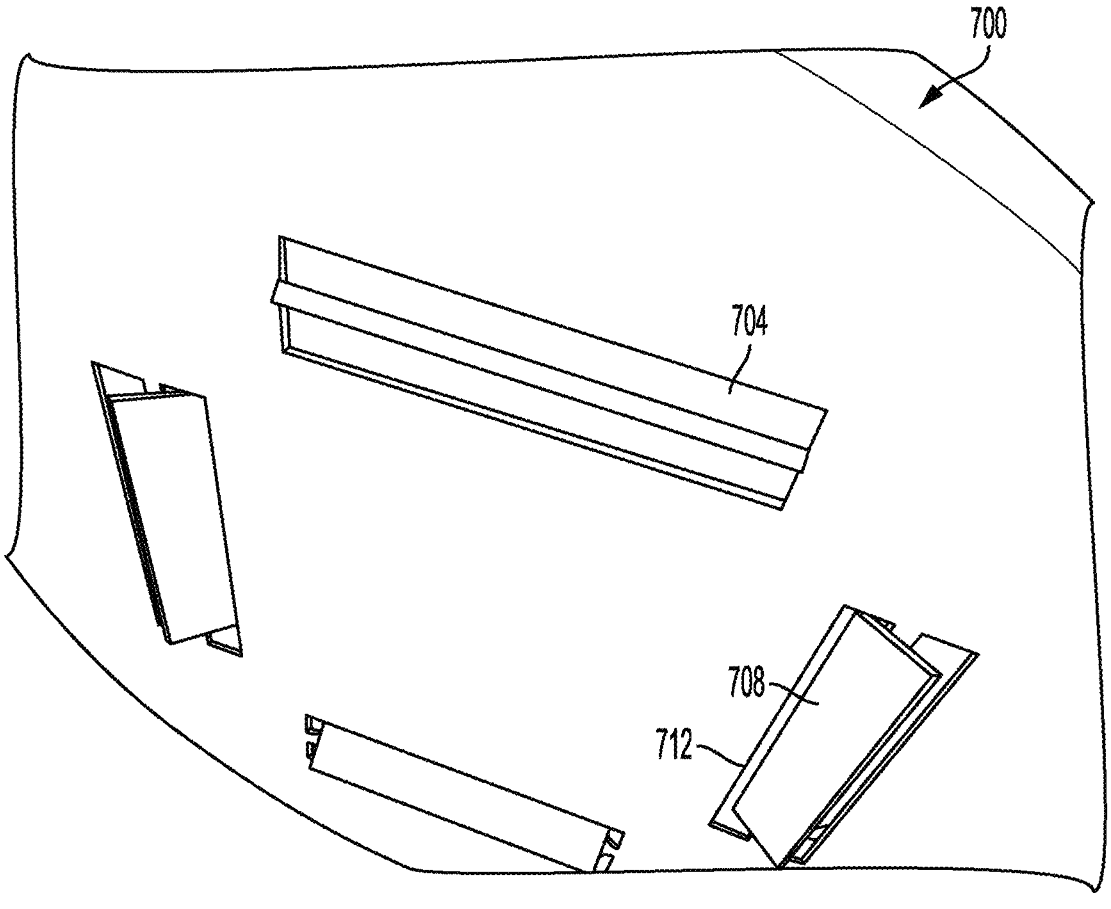
FIG. 7 is a bottom perspective view of an example of a cover plate of a sprinkler that has vents.

FIG. 7 depicts an example of a cover plate 700. The cover plate 700 can include at least one vent 704 and a vent wall 708 coupled with the vent 704. The vents 704 and vent walls 708 can facilitate directing air flow from under the cover plate 700 towards at least one of an activation element (e.g., activation element 136) and the channel (e.g., channel 300). For example, an inner portion 712 of the vent 704 can be outward from an outer edge of the wall (e.g., wall 148) of the cover plate 700.

Figure 8:
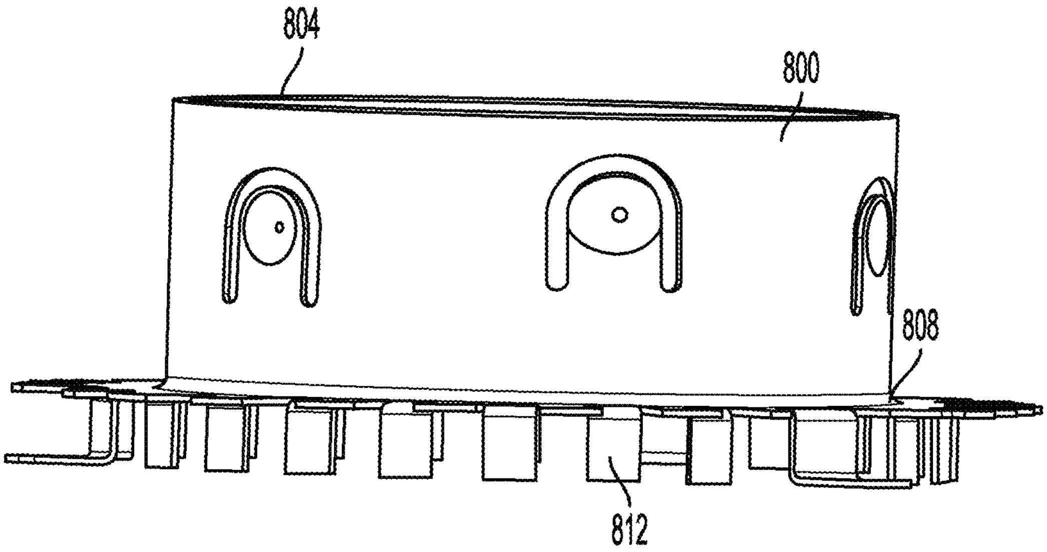
FIG. 8 is a side view of an example of a retaining ring of a sprinkler.

FIG. 8 depicts an example of a retaining ring 800, which can be used to implement the retaining ring 232 described with reference to FIG. 2. The retaining ring 800 can extend from a first housing end 804 to a second housing end 808 that connects with a cover plate (e.g., cover plate 144). The housing 800 can include a plurality of extensions 812 that extend from the second housing end 808 away from the first housing end 804, such as to be positioned in the gap between the cover plate and the second housing end 808 outward from the channel (e.g., channel 300). The extensions 812 can be used to increase turbulence in air flow through the channel to the activation element (e.g., activation element 136). This can be useful for various applications (e.g., to vary activation times), such as depending on the fire hazard classification this can be useful as the height of the hazards and/or intensity of fires or combustion associated with the hazards increases.

Figure 9:
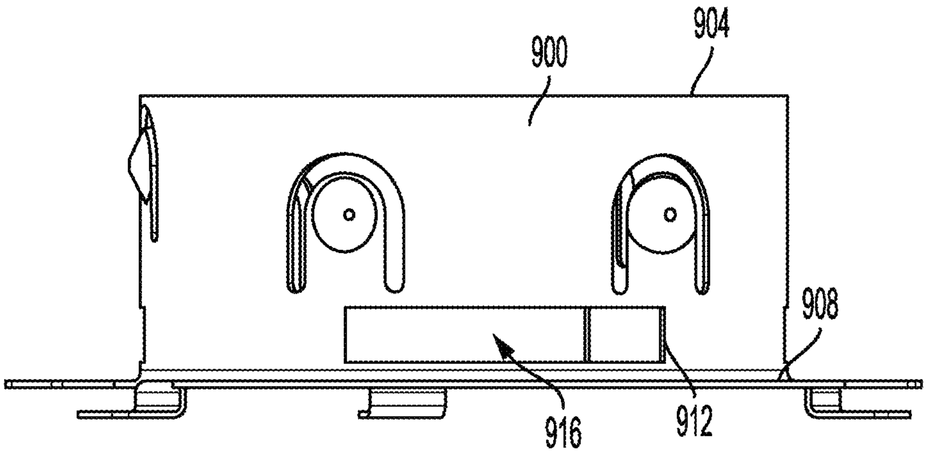
FIG. 9 is a side view of an example of a retaining ring of a sprinkler that has vents.

FIG. 9 depicts an example of a retaining ring 900, which can be used to implement the retaining ring 232 described with reference to FIG. 2. The retaining ring 900 can extend from a first housing end 904 to a second housing end 908 that connects with a cover plate (e.g., cover plate 144). The housing 900 can define a plurality of vents 912 between the first housing end 904 and the second housing end 908. The vents 912 can facilitate air flow into a chamber inside the retaining ring 900 (e.g., chamber 404) separately from air flow through a gap 916, such as to prevent pressure differentials around the retaining ring 900 (e.g., due to temperature gradients) from reducing the air flow rate. For example, the vents 912 can allow additional air to flow to the activation element (e.g., activation element 136) of the sprinkler, and facilitate reducing the activation time activation element 136. The vents 912 can provide help direct air flow within the cavity 208 as the air flows over the wall of the retaining ring 900. The vents 912 can be positioned at various locations relative to the first housing end 904 and second housing end 908; for example, the vents 912 can be positioned closer to the second housing end 908 as depicted in FIG. 9, or closer to the first housing end 904 (e.g., for a retaining ring 1300 as described with reference to FIG. 13, vents can be positioned on the sidewall 1316 between the edge 1312 and the threads 1320).

Figure 10:
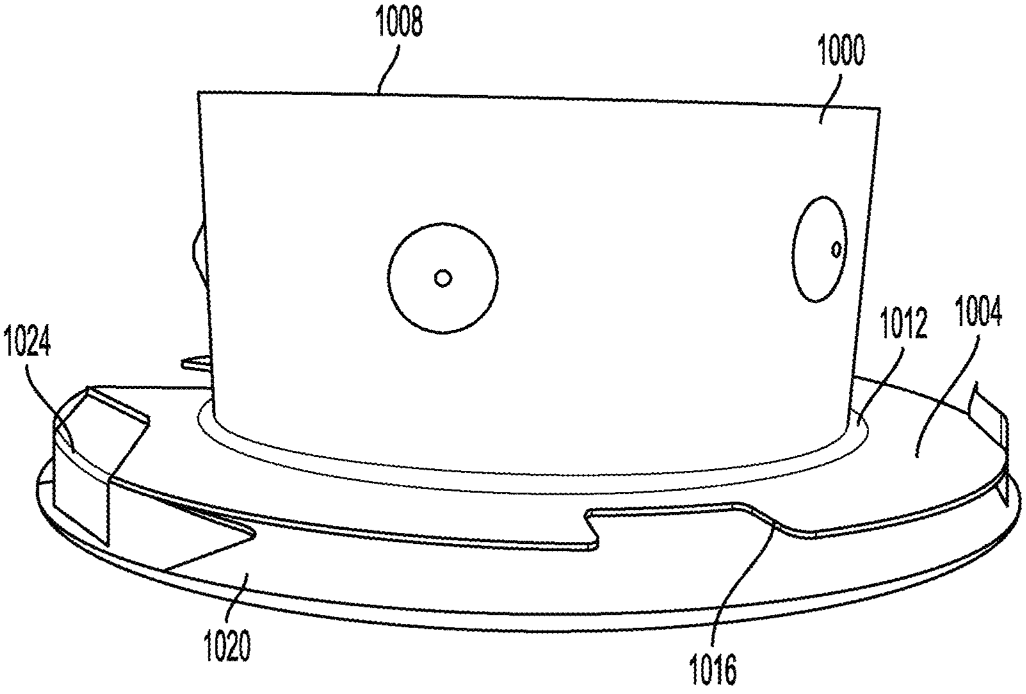
FIG. 10 is a side view of an example of a retaining ring and cover plate of a sprinkler.

FIG. 10 depicts an example of a retaining ring 1000, which can be used to implement the retaining ring 232 described with reference to FIG. 2. The housing 1000 can include or be coupled with retaining ringan extension 1004 (e.g., the retaining ring 1000 can be integrally or monolithically formed with the extension 1004). The retaining ring 1000 can extend from a first housing end 1008 to a second housing end 1012 from which the retaining ringextension 1004 extends (e.g., extends radially outward from the second housing end 1012). The retaining ringextension 1004 can be used to connect the retaining ring 1000 with a cover plate 1020. For example, the retaining ringextension 1004 can define at least one slot 1016 that receives at least one tab 1024 extending from the cover plate 1020. The at least one tab 1024 can have a length greater than or equal to one sixteenth inch and less than or equal to one half inch. The length can be greater than or equal to one eight inch and less than or equal to three eighths inches. The length can be one quarter inch. The sizing of the tab 1024 can correspond to maintaining sufficient force to connect the retaining ring 1000 with the cover plate 1020 so that the cover plate 1020 remains in position with respect to the sprinkler and retaining ring 1000 until force from fluid outputted by the sprinkler causes the cover plate 1020 to disconnect with the retaining ring 1000.

Figure 11:
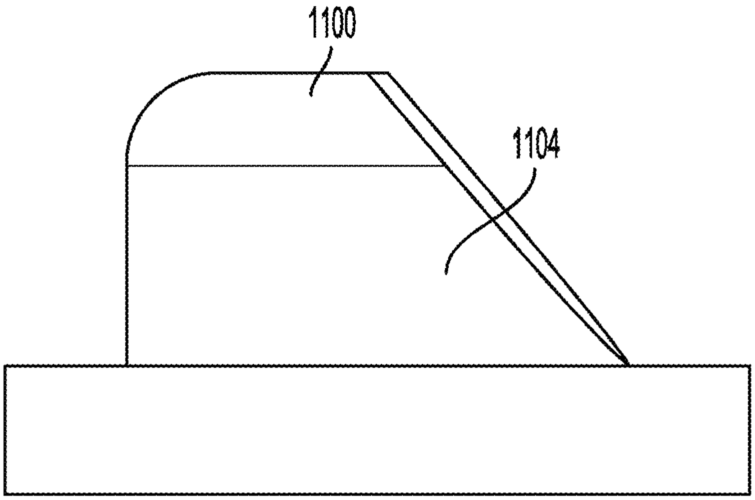
FIG. 11 is a side view of an example of a sprinkler button for sealing a sprinkler.

FIG. 11 depicts an example of a sprinkler button 1100. The sprinkler button 1100 can be used to implement the seal 132 described with reference to FIG. 1. The sprinkler button 1100 can include an angled surface 1104. The angled surface 1104 can enable more effective displacement of the sprinkler button 1100 responsive to water flow through the sprinkler 112 (e.g., responsive to operation of the activation element 136).

Figure 12:
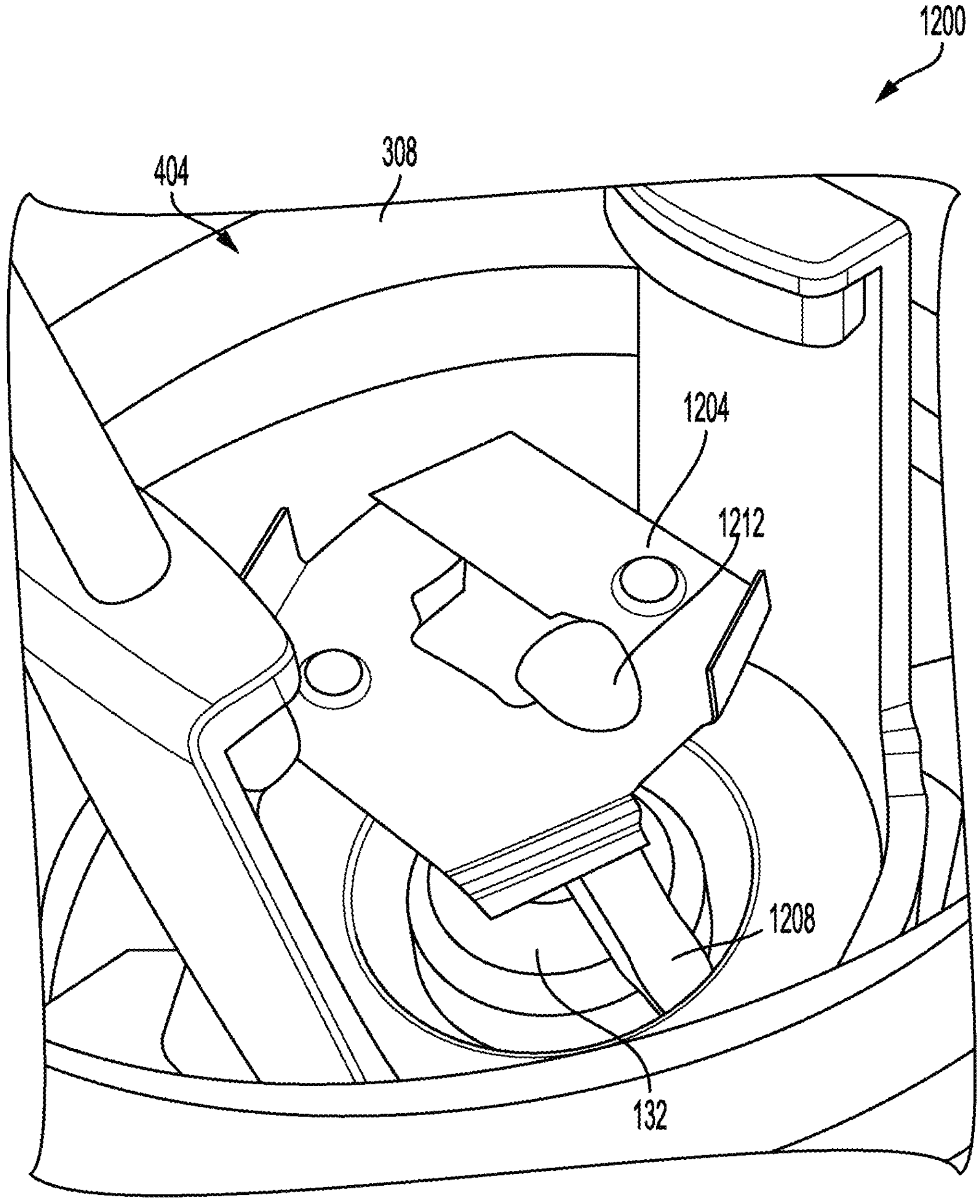
FIG. 12 is a bottom perspective view of an example of an activation element of a sprinkler.

FIG. 12 depicts an example of an activation element 1200. The activation element 1200 can be used to implement the activation element 136 or components thereof described with reference to FIG. 1. The activation element 1200 includes a plurality of links 1204 coupled with a plurality of levers 1208, and contacts the seal 132 while the seal 132 is in the state of sealing the sprinkler 112 (e.g., to apply a force against the seal 132 to hold the seal 132 in the outlet 128 of the fluid passageway 120). The plurality of links 1204 can be attached with one another using an adhesive 1212, such as epoxy (which, in turn, can couple each of the links 1204 and levers 1208 with one another). By attaching the links 1204 with epoxy, the activation element 1200 can be more effectively be driven away from the space between the outlet 128 and the deflector 140 of the sprinkler 112 in order to output fluid responsive to the fire condition (particularly where the distance between the activation element 1200 and the cover plate 144 may be relatively small in various sprinklers 112 described herein, as compared to sprinklers in which it may be useful to drive link or lever components away from each other). For example, by using the adhesive 1212, each of the links 1204 can be bonded with a respective lever 1208 (e.g., two link-lever assemblies), so that the links 1204 and levers 1208 can remain attached with each other and separate away from the sprinkler in two pieces instead of four.

Figure 13:
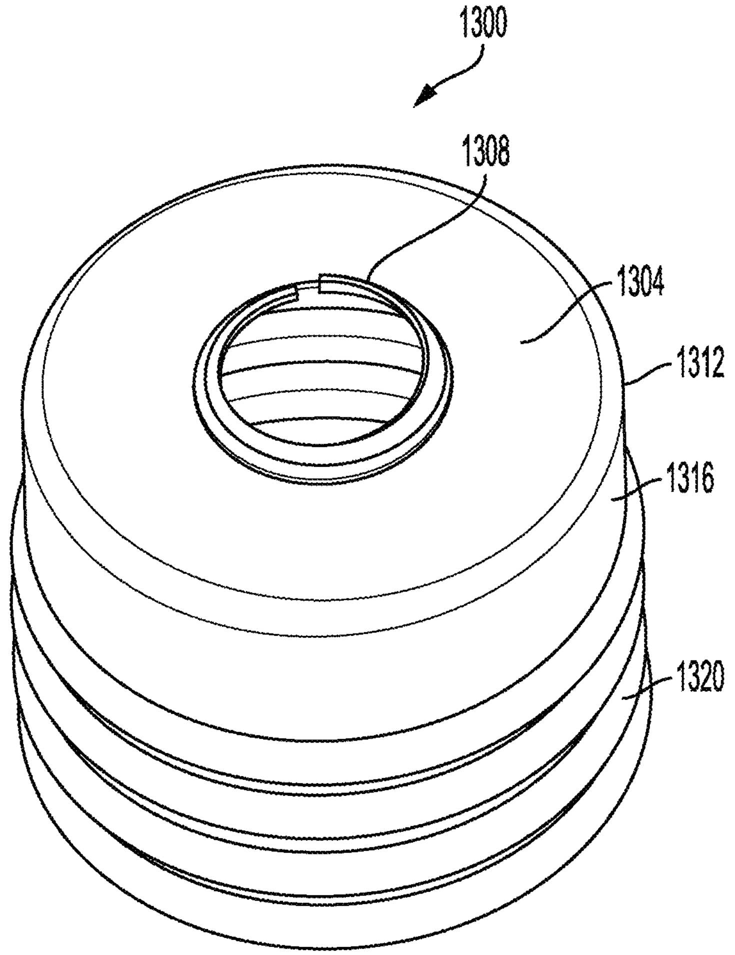
FIG. 13 is a top perspective view of an example of a housing of a sprinkler.

FIG. 13 depicts an example of a housing 1300. The housing 1300 can be used as a sprinkler cup (e.g., the cup 224 described with reference to FIG. 2). The housing 1300 can be formed with or coupled with at least one of the body 116 described with reference to FIG. 1, the housing 308 described with reference to FIG. 3, or portions thereof. The housing 1300 includes an end wall 1304 defining a single opening 1308 (e.g., a remainder of the end wall 1304 outward from the opening 1308 to an edge 1312 between the end wall 1304 and a side wall 1316 is devoid of openings). The opening 1308 can be aligned with the inlet 124 of the sprinkler 112, such as to be transverse to the sprinkler axis 102 such that the sprinkler axis 102 passes through the opening 1308. The side wall 1316 can define one or more threads 1320 to facilitate coupling the housing 1300 with other components. By forming the end wall 1304 with the single opening 1308, the housing 1300 can reduce heat transfer out of the housing 1300 away from the activation element 136, which can improve the rate at which temperature around the activation element 136 increases responsive to a fire condition. The housing 1300 can include openings (e.g., vents) on the side wall 1316, to facilitate air flow past and through the housing 1300.

Figure 14:
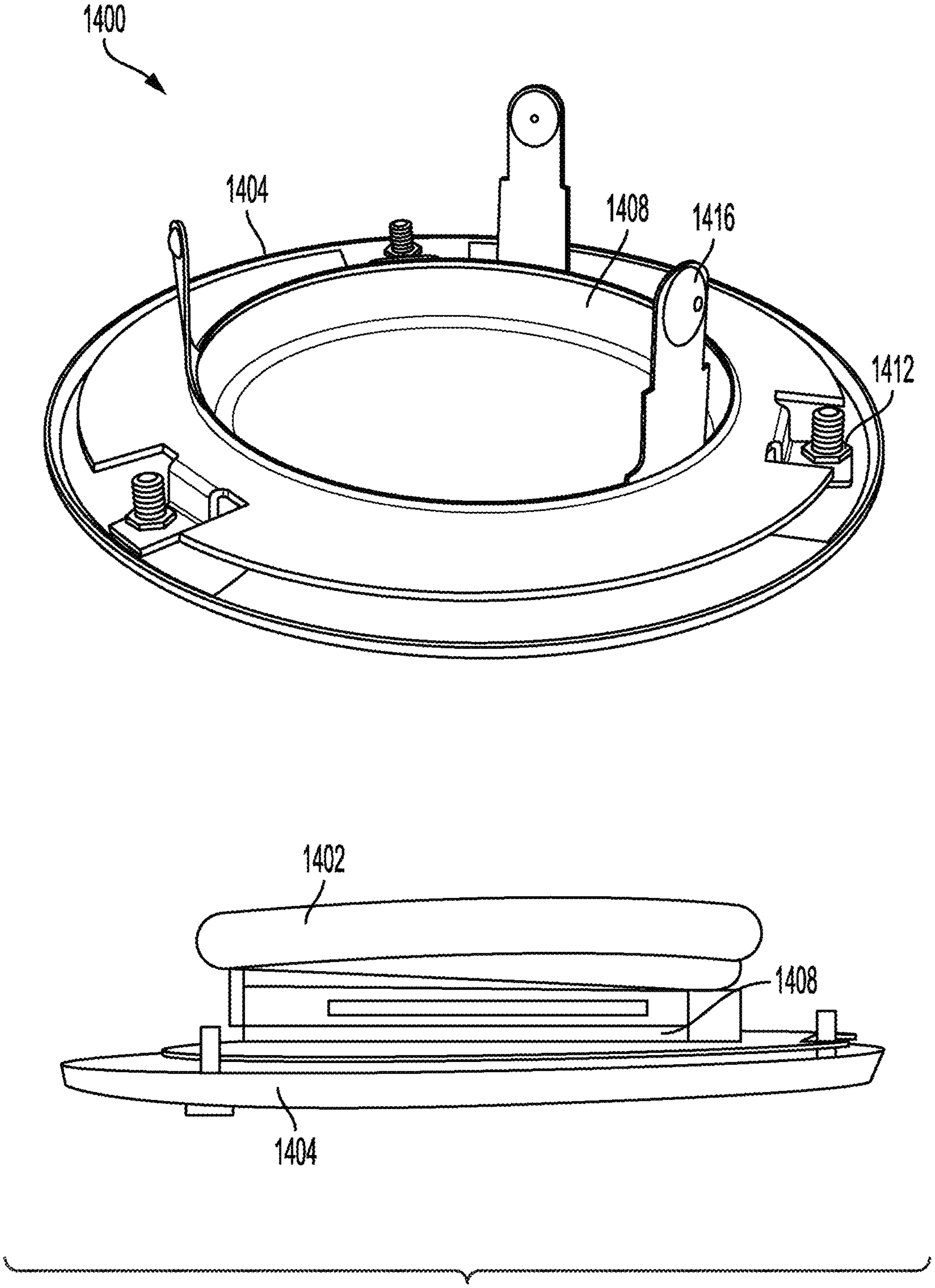
FIG. 14 is a top perspective view and side view of an example of a cover plate assembly and housing of a sprinkler.

FIG. 14 depicts an example of a cover plate assembly 1400. The cover plate assembly 1400 can be pushed onto a cup 1402 (which can incorporate features of various sprinkler cups described herein, such as cup 224 described with reference to FIG. 2). The cover plate assembly 1400 can include a cover plate 1404 and a retaining ring 1408 that can be formed as an assembly (e.g., using fasteners 1412 to couple the cover plate 1404 with the retaining ring 1408). FIG. 14 depicts the fasteners 1412 as implemented using screws; various fasteners 1412 can be used to enable the cover plate 1404 to be fixed with the retaining ring 1408, such as crimps, epoxy, or rivets. The fasteners 1412 can have a greater fixation force than the connection between the retaining ring 1408 and the cup 1402 (e.g., using the at least one tab 1416), so that the assembly of the cover plate 1404 and retaining ring 1408 (as well as a wall coupled with the cover plate 1404 and retaining ring 1408) can both be driven away from the cup 1402 by the force of fluid outputted by a sprinkler on the cover plate 1404.

The retaining ring 1408 can include at least one tab 1416 that can extend from the retaining ring 1408 to couple with the cup 1402. For example, the tab 1416 can be threaded to securely with the cup 1402, such that a retaining force of the coupling is less than force from fluid flow from activation of the sprinkler, allowing the cover plate assembly 1400 to be driven off as appropriate when the sprinkler activates. The tab 1416 can be resilient to allow the cover plate assembly 1400 to be pushed on while also securely connected with the sprinkler housing 1402. For example, the tab retention force applied by the tab 1416 can be less than a minimum force expected to be exerted by fluid acting on the cover plate assembly 1400.

Figure 15:
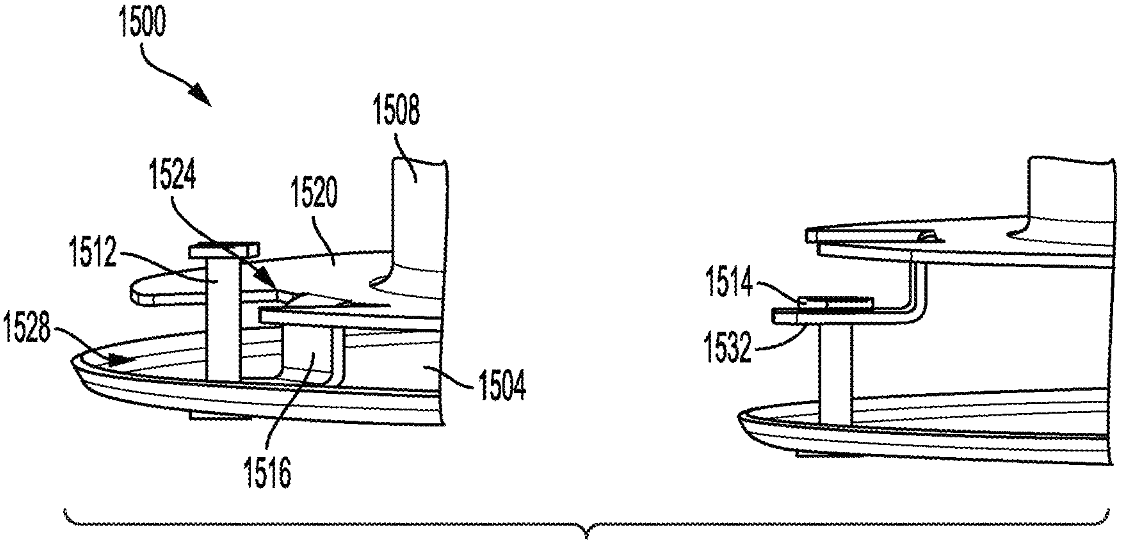
FIG. 15 is a schematic diagram of an example of a cover plate assembly.

FIG. 15 depicts an example of a cover plate assembly 1500. The cover plate assembly 1500 can incorporate features of the cover plate assembly 1400 described with reference to FIG. 14. The cover plate assembly 1500 can include a cover plate 1504 coupled with a retaining ring 1508. For example, the cover plate assembly 1500 can include at least one fastener 1512. The retaining ring 1508 can include extensions 1516 that extend from a ring body 1520 along a slot 1524 in which the fastener 1512 can be positioned. The extensions 1516 can define a gap 1528 between the ring body 1520 and the cover plate 1504. The gap 1528 can be greater than or equal to one sixteenth inch and less than or equal to one half inch. The gap 1528 can be one eighth inch.

The fastener 1512 can be attached with the extension 1516 with solder and received in an opening 1532 of the extension 1516, enabling the solder to hold the retaining ring 1508 in position relative to the cover plate 1504. The fastener 1512 can include at least one of a pin including a rivet, a spring, and a tab. Responsive to melting of the solder, the fastener 1512 can decouple from the extension 1516 (and the retaining ring 1508), allowing the cover plate 1504 to drop away from the retaining ring 1508 (e.g., until an end 1514 of the fastener 1512 having a relatively large diameter contacts the extension 1516 to stop the movement of the fastener 1512 and the cover plate 1504). The movement of the cover plate 1504 can increase the gap 1528 to aid air flow to the activation components of the sprinkler (while allowing for a small gap, such as for access restriction or aesthetic purposes, prior to melting of the solder). The material and amount of the solder can be selected to allow the solder to melt prior to activation of the sprinkler. As discussed with various cover plate assemblies herein, the cover plate assembly 1500 can be driven off of the sprinkler housing responsive to fluid output from the sprinkler.

Figure 16:
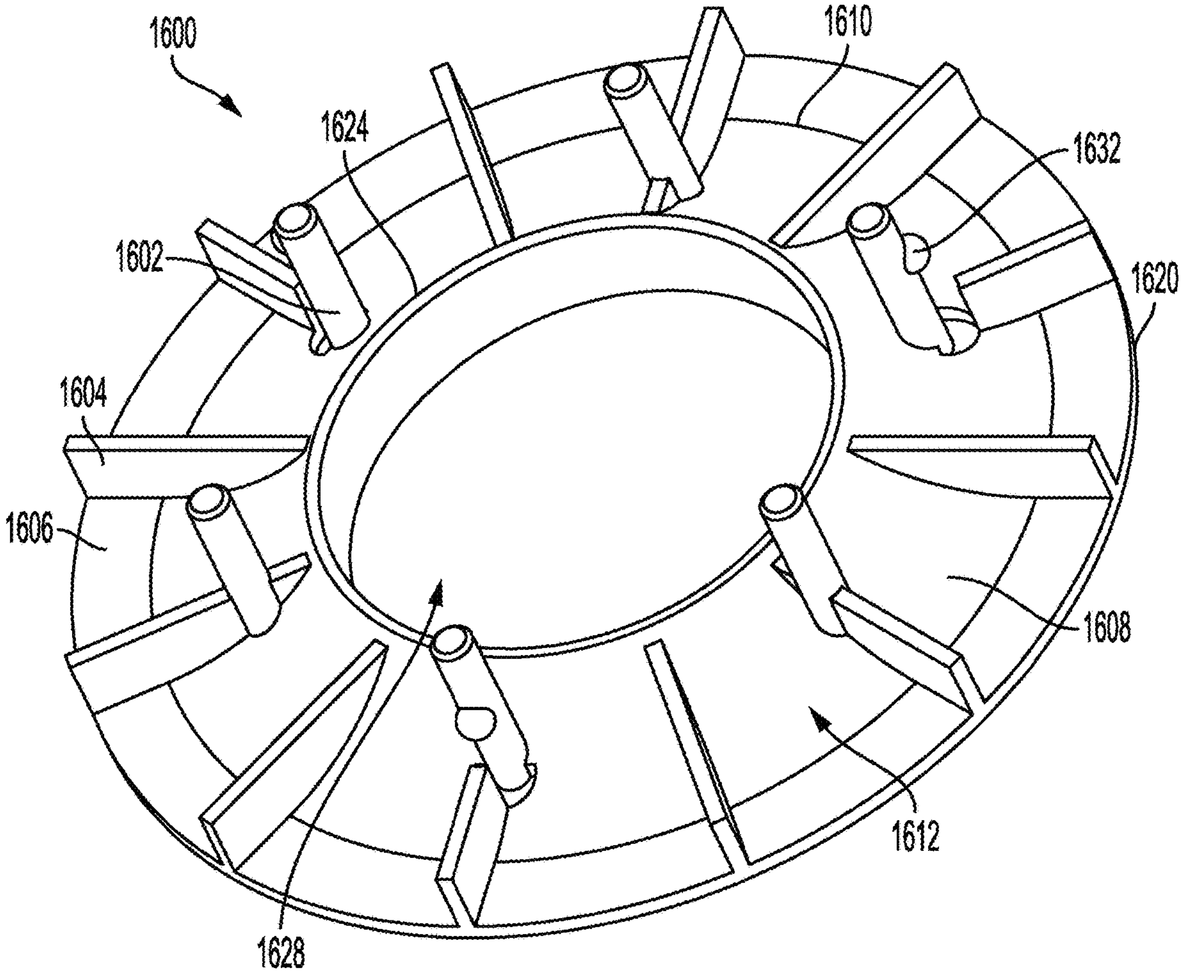
FIG. 16 is a perspective view of an example of a wall of a cover plate assembly.
Figure 17:
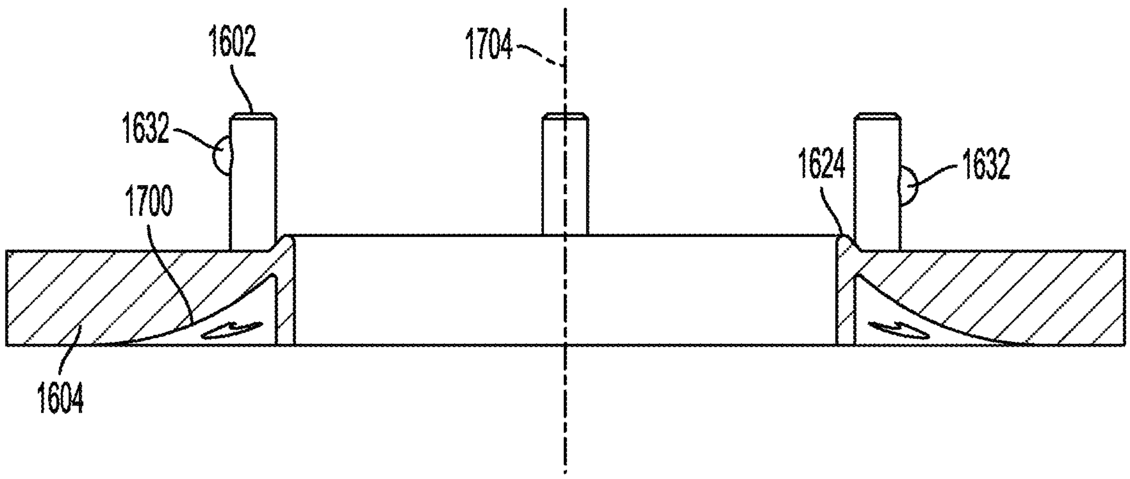
FIG. 17 is a section view of an example of a wall of a cover plate assembly.

FIGS. 16 and 17 depict an example of a wall 1600 that can be implemented with various cover plate assemblies described herein, including but not limited to the cover plate assemblies 1400, 1500. For example, the wall 1600 can be provided between a cover plate and a retaining ring, such as part of an assembly of one or more of the cover plate, wall, and retaining ring. The wall 1600 can be provided with a cover plate and connected directly with a sprinkler cup (e.g., with or without a retaining ring as part of the cover plate assembly). The wall 1600 can incorporate features of various walls described herein, such as the walls 148, 500, 600, including to cause targeted flow rates of air to be directed up into a sprinkler cup towards an activation element. The wall 1600 can include at least one post 1602 to connect the wall with components of a cover plate assembly (e.g., with corresponding slots in a retaining ring) or to connect the wall with the sprinkler cup (e.g., such that the cover plate assembly may or may not include a retaining ring).

The wall 1600 can include a plurality of fins 1604 that extend from a base 1606 and a wall surface 1608, forming channels 1612 for air flow over the wall 1600. A number of the fins 1604 can be selected to enable effective air flow over the wall 1600 (e.g., towards an activation element of a sprinkler) to achieve target timings for activation of the activation element given factors such as a thermal rating of the activation element and types of commodities or hazards for which a sprinkler implementing the wall 1600 is to be used. For example, the number of fins 1604 can be greater than or equal to six and less than or equal to twenty. The number can be greater than or equal to nine and less than or equal to fifteen. The number can be twelve.

As depicted in FIG. 16, the wall surface 1608 can extend out of the base 1606 beginning at an outer edge 1610 at a distance away from an outer edge 1620 of the base 1606, while the fins 1604 can extend from the outer edge 1620. The wall surface 1608 can be shaped to facilitate air flow along the wall surface 1608, such as by having a concave curvature 1700 facing towards the outside of the wall 1600. The wall surface 1608 can terminate at a central edge 1624 to define an inner opening 1628. Various walls described herein, such as the wall 1600, can use the inner opening 1628 to allow a deflector (e.g., deflector 140) to be deployed through the inner opening 1628, such as by allowing the deflector and guide pins (e.g., guide pins 1832 depicted in FIG. 18) to be translated through the inner opening 1628.

One or more of the posts 1602 can include an extension 1632. The extensions 1632 can be, for example, protrusions or bumps. The extensions 1632 can extend outward from the posts 1602, such as to extend away from an axis 1704 (the axis 1704 can align with the sprinkler axis 102). The extensions 1632 can enable the posts 1602 to engage other components, such as to engage at least one of the retaining ring or the sprinkler cup. As depicted in FIG. 17, the extensions 1632 can be arranged at different heights relative to the central edge 1624. As depicted in FIG. 16, at least some of the posts 1602 can be positioned inward of an inward edge of a respective fin 1604, and/or at least some of the posts 1602 can be positioned along a respective fin 1604.

Figure 18:
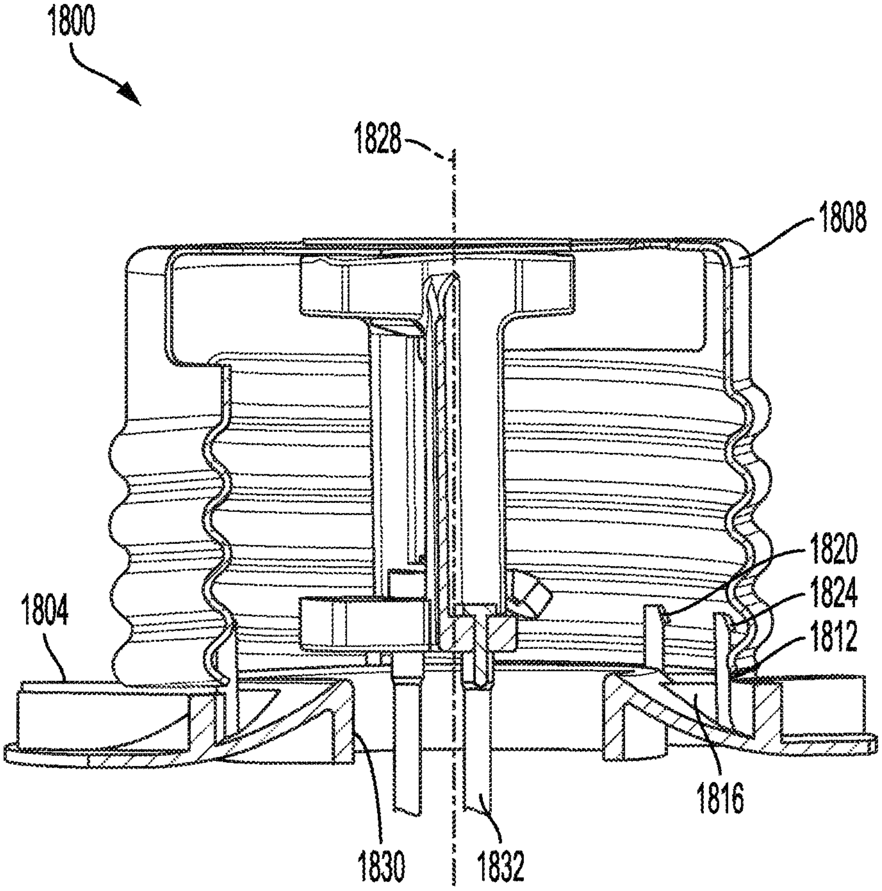
FIG. 18 is a perspective view of an example of a cover plate assembly.

FIG. 18 depicts an example of a cover plate assembly 1800 in which a wall 1804 engages with a sprinkler cup 1808, such that a retaining ring need not be provided as part of the cover plate assembly. The cover plate assembly 1800 can allow for more direct air flow over the wall 1804 into the sprinkler cup 1808 (e.g., towards the activation element). The wall 1804 can incorporate features of various walls described herein, including but not limited to the wall 1600. The sprinkler cup 1808 can incorporate features of various sprinklers cups described herein, including but not limited to the sprinkler cup 1300.

The wall 1804 can include a plurality of posts 1812, which can extend from fins 1816 or other portions of the wall 1804. The posts 1812 can terminate at distal ends 1820, and include tabs 1824 at or proximate the distal ends 1820. The tabs 1824 can extend outward (e.g., relative to axis 1828), and can be slanted, such as by extending less far outward towards the distal ends 1820 than towards an inner portion of the posts 1812. As such, the tabs 1824 can allow for controllable insertion of the wall 1804 into the sprinkler cup 1808 to engage with the threading 1828 of the sprinkler cup 1808. As depicted in FIG. 18, the inner opening 1830 of the wall 1804 can allow for deployment of a deflector (e.g., deflector 140) by guide pins 1832. For example, the retention force between the tabs 1824 and the sprinkler cup 1808 can be greater than a retention force between the wall 1804 and a cover plate coupled with the wall 1804 (e.g., various cover plates described herein), so that fluid outputted by the sprinkler that includes the guide pins 1832 can cause the cover plate to release while the wall 1804 remains coupled with the sprinkler cup 1808.

Figure 19:
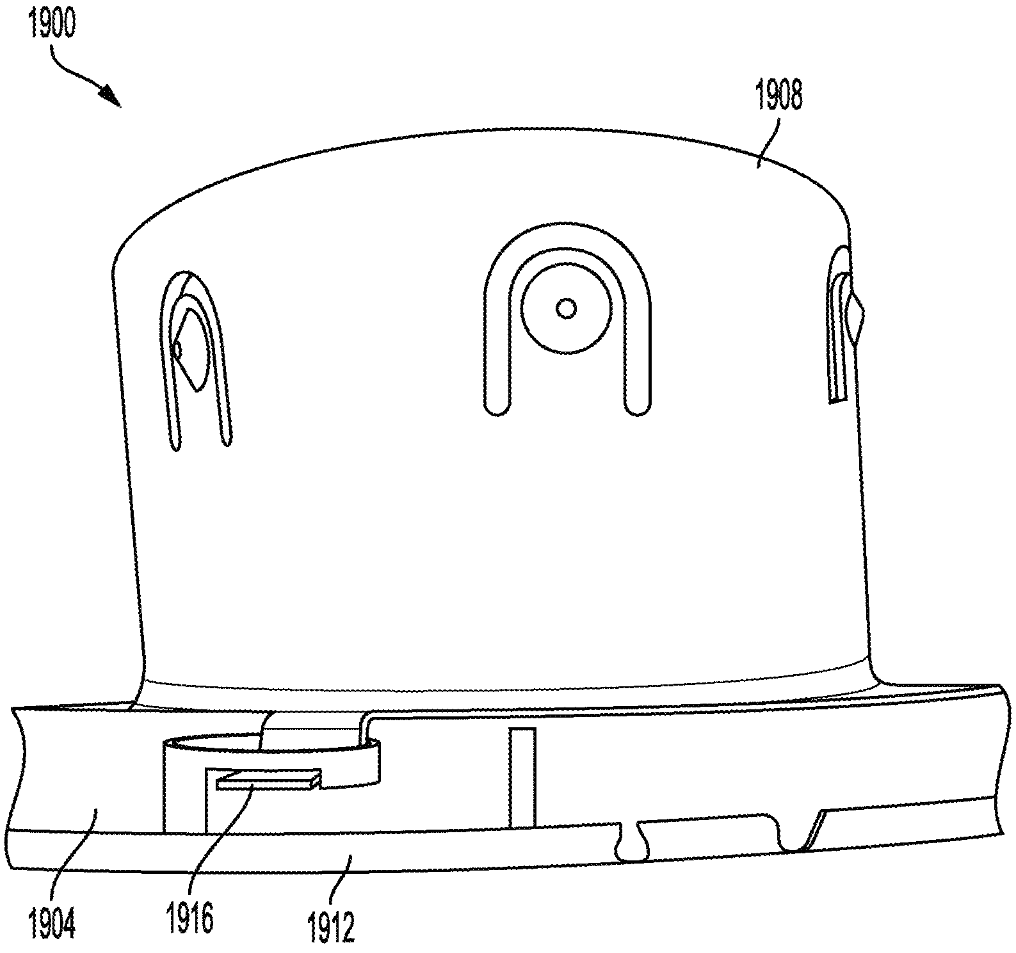
FIG. 19 is a perspective view of an example of a cover plate assembly.
Figure 20:
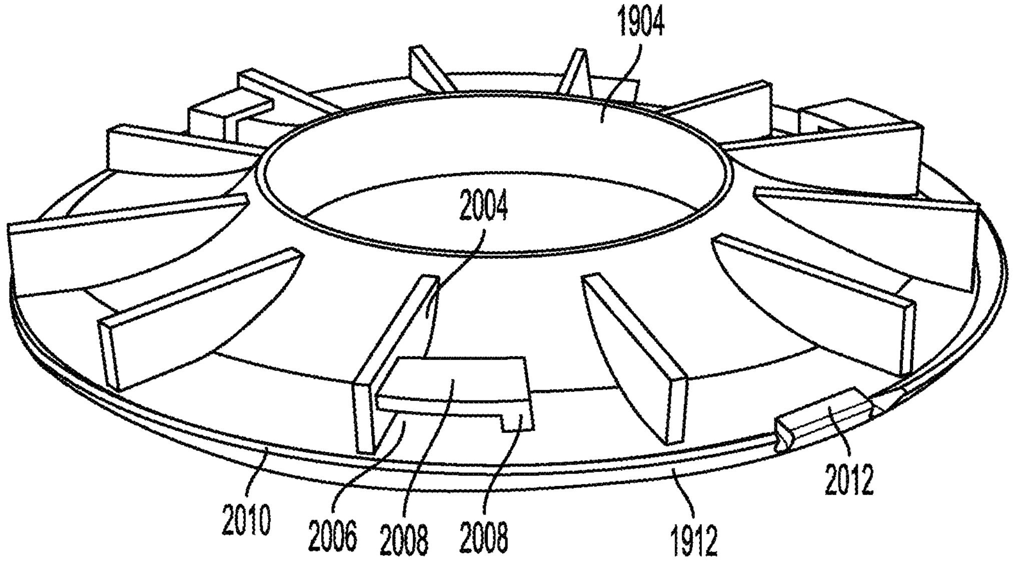
FIG. 20 is a perspective view of an example of a wall of a cover plate assembly.

FIGS. 19 and 20 depict an example of a cover plate assembly 1900 that uses a rotational engagement between a wall 1904 and retaining ring 1908, and a crimp engagement between the wall 1904 and a cover plate 1912. The wall 1904 can incorporate features of various walls described herein, including but not limited to the wall 1600. The retaining ring 1908 can incorporate features of various retaining rings described herein, including but not limited to the retaining ring 1508.

The wall 1904 can include a plurality of fins 2004 extending to an outer edge 2010 of the wall 1904. At least some of the fins 2004 can include a receiver 2008 that extends transverse to the fins 2004, such as by extending along the outer edge 2010, to define a slot 2006 between the receiver 2008 and the outer edge 2010. The receiver 2008 can terminate in an extension 2009, which can act as a stop against a remote member received in the slot. For example, as depicted in FIG. 19, a tab 1916 of the retaining ring 1908 can extend outward from a bottom end of the retaining end and be received in the slot 2006 to engage the wall 1904 with the retaining ring 1908.

The cover plate 1912 can include a crimp 2012. The crimp 2012 can be formed, for example, by a malleable or flexible portion of the cover plate 1912 that can be bent into the shape of the crimp 2012. As such, the crimp 2012 can engage the cover plate 1912 with the wall 1904 (which can be engaged with the retaining ring 1908 to form an assembly of the wall 1904, retaining ring 1908, and cover plate 1912 The engagements between the wall 1904 and the retaining ring 1908, and between the wall 1904 and the cover plate 1912, can each be stronger than a retention force between the retaining ring 1908 and a sprinkler cup, so that the cover plate assembly 1900 can be released from the sprinkler cup responsive to the force of fluid outputted by the sprinkler.

Figure 21:
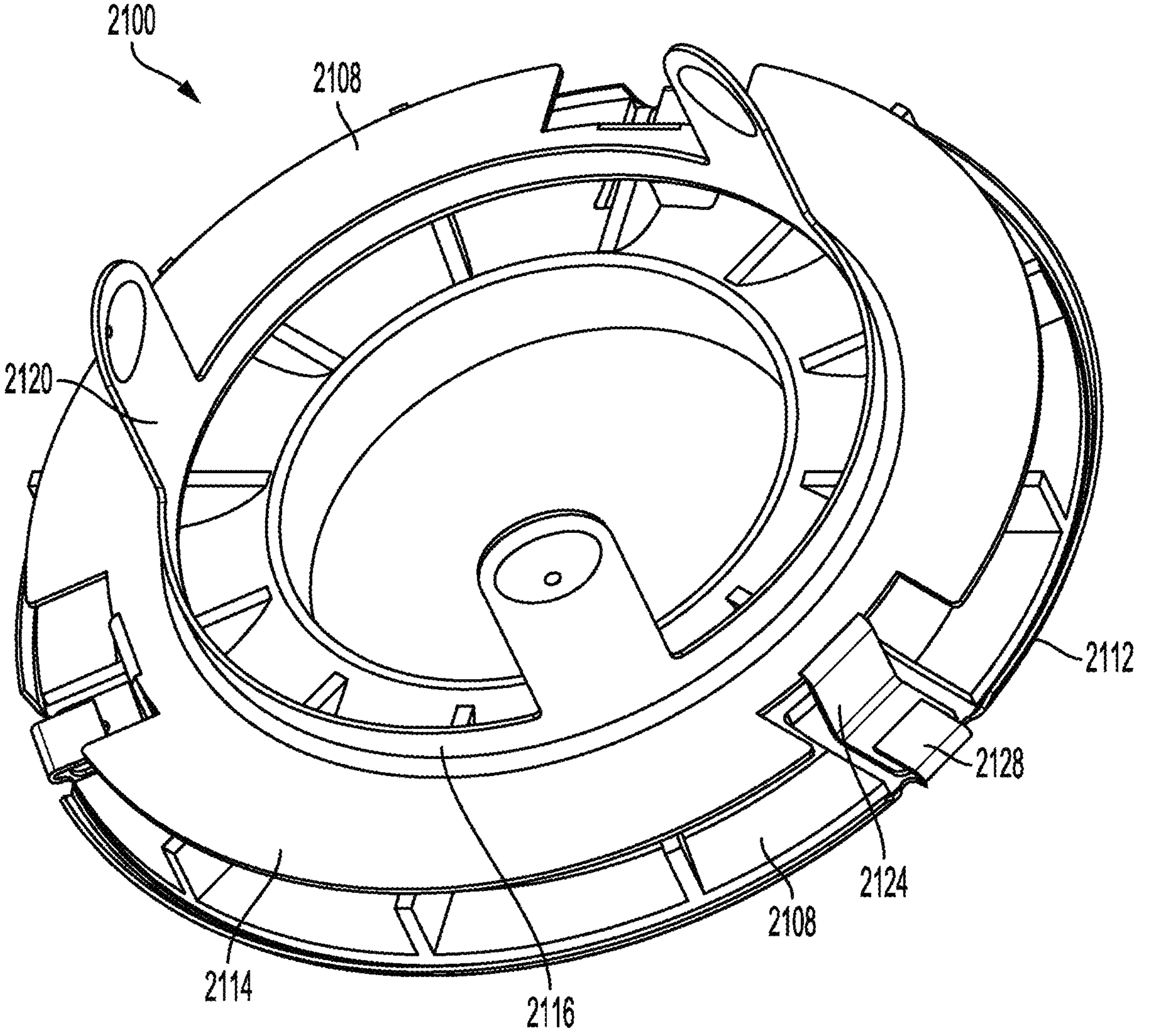
FIG. 21 is a perspective view of an example of a cover plate assembly.
Figure 22:
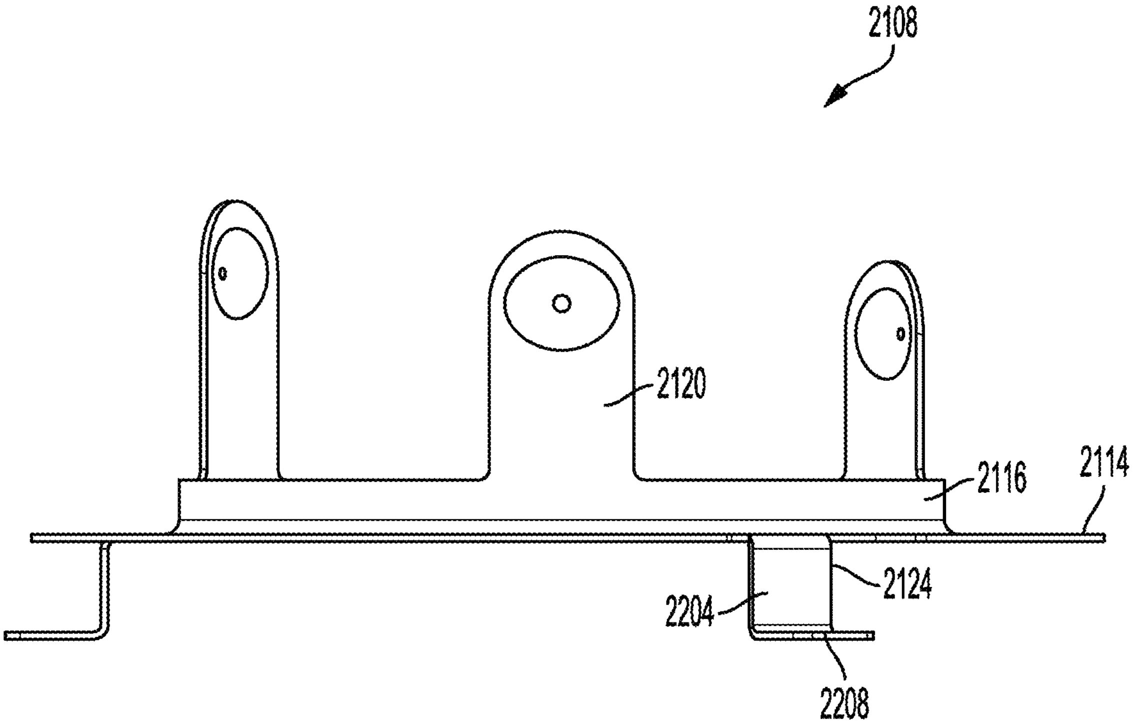
FIG. 22 is a side view of an example of a retaining ring of a cover plate assembly.
Figure 23:
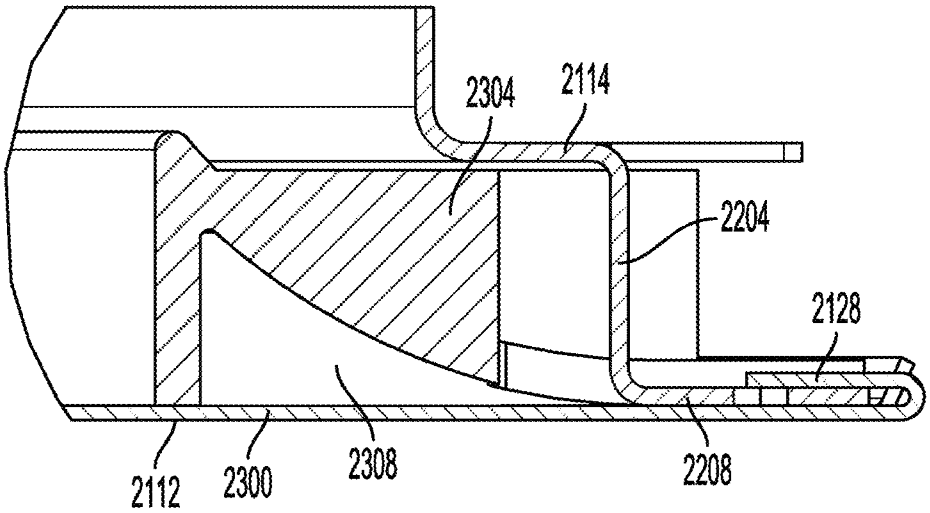
FIG. 23 is a section detail view of an example of crimp engagements of a cover plate assembly.

FIGS. 21-23 depict an example of a cover plate assembly 2100 that uses a crimp engagement between each of a wall 2104, retaining ring 2108, and cover plate 2112. The wall 2104 can incorporate features of various walls described herein, such as the wall 1904. The retaining ring 2108 can incorporate features of various retaining rings described herein, such as the retaining ring 1908; similar to the retaining ring 1408, the retaining ring 1908 can have a relatively short sidewall 2116 from which tabs 2120 extend (the vertical sidewall 2116 may also not be present, such that the tabs 2120 extend directly from a wall 2114), to enable a particular air flow profile over the wall 2104. The cover plate 2112 can incorporate features of various cover plates described herein, including the cover plate 1912.

As depicted in FIGS. 21-23, the retaining ring 2108 can include a plurality of engagement members 2124 that extend in an opposite direct from wall 2114 from the tabs 2120. The engagement members 2124 can be formed so that an end of the engagement members distal from the wall 2114 can be spaced away from the wall 2114 and define a surface to receive a crimp 2128 of the cover plate 2112. The engagement members 2124 can be formed from multiple walls, such as a first wall 2204 transverse to the wall 2114 (e.g., within 15 degrees of perpendicular to a plane in which the wall 2114 lies) and a second wall 2208 transverse to the first wall 2204 (e.g., within 15 degrees of perpendicular to a plane in which the first wall 2204 lies; within 15 degrees of parallel with the plane in which the wall 2114 lies).

The cover plate 2112 can include a plate wall 2300 from which the crimp 2128 extends, such that the crimp 2128 extends back over the cover plate 2112 to secure the engagement member 2124. As depicted in FIGS. 21-23, the wall 2104 can be integrally formed with the cover plate 2112; for example, components of the wall 2104 such as fins 2304 and wall surface 2308 can be formed as part of the cover plate 2112 and extend from the plate wall 2300. The cover plate 2112 and wall 2104 can be formed as separate components, such that an outer edge of the wall 2104 can be received by the crimp 2128 together with the engagement member 2124 to secure each of the cover plate 2112 and wall 2104 with the retaining ring 2108. In addition or alternatively to using the crimp 2128, one or more of the engagement members 2124 can be coupled with at least one of the wall 2104 and the cover plate 2112 using an adhesive (e.g., an adhesive applied between various combinations of the engagement member 2124, the wall 2104, and the cover plate 2112).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A concealed sprinkler, comprising:

a body that defines an outlet around an axis;

a seal that seals the outlet;

an activation element coupled with the seal, the activation element changes from a first state to a second state responsive to a fire condition to allow the seal to be displaced from the outlet;

a housing extending from a first housing end that extends from the body to a second housing end that is outward from the axis, the housing defines a chamber around the activation element, the activation element is between the second housing end and the first housing end;

a cover plate coupled with the second housing end; and a wall that extends from the cover plate, towards the activation element, to an inner edge that is spaced from the second housing end, to form an air flow channel into the chamber to the activation element adjacent to the wall, the air flow channel comprising a channel inlet defining a gap between the cover plate and the second housing end, at least one of a retaining ring, the cover plate, and the wall removably coupled with the body.

2. The concealed sprinkler of claim 1, comprising:

the wall includes at least one of a ramp, a baffle, a fin, and a vent.

3. The concealed sprinkler of claim 1, comprising:

an assembly comprising at least one of the retaining ring, the cover plate, and the wall, the assembly is removably coupled with the body.

4. The concealed sprinkler of claim 1, comprising:

the cover plate defines a distance from the cover plate to the activation element.

5. The concealed sprinkler of claim 1, comprising:

the cover plate is attached to the retaining ring by at least one of solder, a fastener, a tab, a crimp, and an adhesive.

6. The concealed sprinkler of claim 1, comprising:

the retaining ring is integrally formed as one or more tabs of the wall to removably attach the cover plate with the housing.

7. The concealed sprinkler of claim 1, comprising:

the body defines a fluid passageway extending from an inlet to the outlet and the axis extending through the inlet and the outlet; and the first housing end comprises an end wall that extends transverse to the axis, the end wall defines a single opening, the single opening around the axis.

8. The concealed sprinkler of claim 1, comprising:

the activation element comprises at least one of a bulb and a plurality of levers coupled with the seal and a plurality of fusible links bonded to the plurality of levers.

9. The concealed sprinkler of claim 1, comprising:

the housing comprises a sprinkler cup, the cover plate removably coupled with the housing.

10. The concealed sprinkler of claim 1, comprising:

the wall comprises a portion that decreases in diameter from the cover plate towards the activation element.

11. A sprinkler system, comprising:

a building structure that defines a cavity; and a sprinkler, comprising:

a body that defines an inlet coupled with one or more pipes and an outlet coupled with the inlet, the outlet around an axis;

a seal that seals the outlet to prevent fluid from the one or more pipes from flowing through the outlet;

an activation element coupled with the seal, the activation element changes from a first state to a second state to allow the fluid to flow through the outlet;

a housing comprising a first housing end coupled with the body and a second housing end that is outward from the axis, the housing positioned in the cavity, the housing defines a chamber around the activation element, the activation element is between the first housing end and the second housing end;

a cover plate coupled with the housing; and a wall that extends from the cover plate, towards the activation element, to an inner edge that spaced from the second housing end, to form an air flow channel into the chamber to the activation element along the wall, the air flow channel comprising a channel inlet defining a gap between the cover plate and the second housing end, at least one of the cover plate and the wall are removably coupled with the body.

12. The sprinkler system of claim 11, comprising:

the housing comprises a sprinkler cup; and an assembly comprising at least one of a retaining ring, the cover plate, and the wall, the assembly removably coupled with at least one of the sprinkler cup and a sprinkler box in the cavity.

13. The sprinkler system of claim 11, comprising:

the cover plate defines a distance from the cover plate to the activation element, a ratio of the distance to the gap is greater than or equal to 1:2 and less than or equal to 2:1.

14. The sprinkler system of claim 11, comprising:

the cover plate is attached to the housing by at least one of solder, a fastener, a tab, a crimp, and an adhesive.

15. The sprinkler system of claim 11, comprising:

the activation element comprises at least one of a bulb and a plurality of levers coupled with the seal and a plurality of fusible links bonded to the plurality of levers.

16. The sprinkler system of claim 11, comprising:

an assembly comprising at least one of a retaining ring, the cover plate, and the wall, the assembly is removably coupled with the body.

17. The concealed sprinkler of claim 1, comprising: the inner edge is closer to the axis than the second housing end is to the axis.

18. The concealed sprinkler of claim 1, comprising: the inner edge is structured to form the air flow channel on a side of the wall facing towards the chamber, the side of the wall facing the channel inlet.

19. The concealed sprinkler of claim 1, comprising: the wall is annular.

20. The concealed sprinkler of claim 1, comprising: the channel inlet is outward from the wall relative to the axis.

* * * * *